(12) United States Patent
Ganapathiappan et al.

(10) Patent No.: US 8,944,579 B2
(45) Date of Patent: Feb. 3, 2015

(54) INK-JET INKS INCLUDING INTER-CROSSLINKABLE LATEX PARTICLES

(75) Inventors: Sivapackia Ganapathiappan, Los Altos, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 13/384,856

(22) PCT Filed: Aug. 18, 2009

(86) PCT No.: PCT/US2009/054208
§ 371 (c)(1),
(2), (4) Date: Jan. 19, 2012

(87) PCT Pub. No.: WO2011/022001
PCT Pub. Date: Feb. 24, 2011

(65) Prior Publication Data
US 2012/0140008 A1 Jun. 7, 2012

(51) Int. Cl.
*B41J 2/01* (2006.01)
*C08F 220/28* (2006.01)
(Continued)

(52) U.S. Cl.
CPC ............ *C08F 220/28* (2013.01); *B41J 2/2107* (2013.01); *B41M 5/0023* (2013.01); *B41M 7/009* (2013.01); *C08F 212/08* (2013.01); *C09D 11/30* (2013.01); *C09D 133/062* (2013.01)
USPC .............................. 347/100; 347/95; 347/101

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ........... 347/100, 9, 95, 96, 101, 102, 103, 88, 347/99, 105, 20, 21; 106/31.6, 31.13, 106/31.27; 523/160, 161

See application file for complete search history.

(56) References Cited

U.S. PATENT DOCUMENTS

| 5,962,571 A | 10/1999 | Overbeek et al. |
| 6,180,691 B1 | 1/2001 | Cheng et al. |

(Continued)

FOREIGN PATENT DOCUMENTS

| CN | 1817981 | 8/2006 |
| CN | 101348541 | 1/2009 |

(Continued)

OTHER PUBLICATIONS

Chinese Office Action dated Jul. 19, 2013 for 200980160964.X.
(Continued)

*Primary Examiner* — Manish S Shah (57) ABSTRACT

The present disclosure includes compositions, methods, and systems having an ink-jet ink including a liquid vehicle, a colorant dispersed or dissolved in the liquid vehicle, inter-crosslinkable latex particles dispersed in the liquid vehicle, and an inter-particle crosslinker. The inter-crosslinkable latex particles can have at least one hydrophobic monomer; at least one acidic monomer; at least one inter-crosslinkable monomer including at least one keto group; the inter-crosslinkable monomer having the structure described in Formula 1. Additionally, the inter-crosslinkable latex particles can be intra-crosslinked forming an inter-particle crosslinked latex polymer film after printing and upon at least partial depletion of the liquid vehicle or liquid vehicle component.

20 Claims, 2 Drawing Sheets

(51) Int. Cl.
*B41J 2/21* (2006.01)
*C09D 11/30* (2014.01)
*C09D 133/06* (2006.01)
*B41M 5/00* (2006.01)
*B41M 7/00* (2006.01)
*C08F 212/08* (2006.01)

(56) References Cited

U.S. PATENT DOCUMENTS

| | | | |
|---|---|---|---|
| 2003/0119943 A1 | 6/2003 | Tucker et al. | |
| 2006/0063868 A1* | 3/2006 | Janmaat et al. | 524/160 |
| 2006/0083870 A1 | 4/2006 | Chen | |
| 2006/0083871 A1 | 4/2006 | Chen | |
| 2006/0199877 A1* | 9/2006 | Ganapathiappan | 523/160 |
| 2007/0211126 A1* | 9/2007 | Bauer et al. | 347/100 |
| 2008/0182960 A1 | 7/2008 | Ganapathiappan | |
| 2011/0196084 A1* | 8/2011 | Nabuurs et al. | 524/458 |

FOREIGN PATENT DOCUMENTS

| | | |
|---|---|---|
| EP | 0758673 | 2/1997 |
| EP | 1393922 | 3/2004 |
| EP | 1502759 | 2/2005 |
| EP | 0758364 | 4/2006 |
| EP | 1666270 | 6/2006 |
| EP | 1988136 | 11/2008 |
| JP | 2003003035 | 1/2003 |
| JP | 2003071374 | 3/2003 |
| JP | 2004250659 | 9/2004 |
| JP | 2006016499 | 1/2006 |
| WO | WO-2007103542 | 9/2007 |
| WO | WO-2008083991 | 7/2008 |
| WO | WO-2010120278 | 10/2010 |

OTHER PUBLICATIONS

European Search Report dated Jun. 24, 2014, Applicant Hewlett-Packard Development Company, L.P., Application No./Patent No. 09848554.3-1302/2467434 PCT/US2009054208.

* cited by examiner

INK-JET INKS INCLUDING INTER-CROSSLINKABLE LATEX PARTICLES

BACKGROUND

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to thermal ink-jet architecture.

As ink-jet ink applications have advanced, improvement of such printing systems through ongoing research and developmental efforts continue to be sought.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink-jet ink. Liquid vehicles are well known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "liquid vehicle component" refers to any solvent, co-solvent, and/or liquid present in a liquid vehicle.

As used herein, "colorant" can include dyes, pigments, and/or other particulates that may be suspended or dissolved in an ink vehicle prepared in accordance with embodiments of the present disclosure. Dyes are typically water soluble, and therefore, can be desirable for use in some embodiments. However, pigments can also be used in other embodiments. Pigments that can be used include self-dispersed pigments and polymer dispersed pigments. Self-dispersed pigments include those that have been chemically surface modified with a small molecule, a polymeric grouping, or a charge. This chemical modification aids the pigment in becoming and/or substantially remaining dispersed in a liquid vehicle. A polymer dispersed pigment includes a pigment dispersed by a separate additive, which can be a polymer, an oligomer, or a surfactant, for example, in the liquid vehicle and/or in the pigment that utilizes a physical coating to aid the pigment in becoming and/or substantially remaining dispersed in a liquid vehicle.

As used herein, "pigment" generally includes pigment colorants, magnetic particles, aluminas, silicas, and/or other ceramics, organometallics or other opaque particles, whether or not such particulates impart color. Thus, though the present description primarily exemplifies the use of pigment colorants, the term "pigment" can be used more generally to describe not only pigment colorants, but other pigments such as organometallics, oxides, ferrites, ceramics, etc. In one specific embodiment, however, the pigment is a pigment colorant.

As used herein, "dye" refers to the individual compound, complex, or molecule that is typically water soluble.

As used herein, "alkyl" generally refers to lower alkyl aliphatic carbon chains. For example, lower alkyl aliphatic carbon chains can have 1 to 8 carbons. It is understood that such chains can be linear or branched. Further, "substituted alkyl" refers to "alkyl" groups that can be substituted with heteroatoms or groups as known in the art.

As used herein, $T_g$ is the glass transition temperature as calculated by the Fox equation: copolymer $T_g = 1/(Wa/(T_gA) + Wb/(T_gB) + \ldots)$ where Wa=weight fraction of monomer A in the copolymer and $T_gA$ is the homopolymer $T_g$ value of monomer A, Wb=weight fraction of monomer B and $T_gB$ is the homopolymer $T_9$ value of monomer B, etc.

As used herein, "depletion" refers to the removal of the liquid vehicle or one or more liquid vehicle components from an ink-jet ink after printing causing cross-linking of the inter-crosslinkable latex particles present in the ink. The removal may be by evaporation, absorption, and/or heating. Additionally, removal may be facilitated by any chemical reactions/interactions including azeotropic effects. Additionally, "partial depletion" refers to a "depletion" where at least some of the liquid vehicle or one or more liquid vehicle components is present during the cross-linking of the inter-crosslinkable latex particles present in the ink.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that the use of inter-crosslinkable latex particles in ink-jet inks can provide a durable ink-jet image. In accordance with this, the present disclosure is drawn to compositions, methods, and systems using inter-crosslinkable latex particles in ink-jet ink applications. It is noted that when discussing the present compositions, associated methods, or associated systems, each of these discussions can be considered applicable to each of these embodiments, whether or not they are explicitly discussed in the context of that embodiment. Thus, for example, in discussing an inter-crosslinkable latex particle present in an ink-jet ink, such an inter-crosslinkable latex particle can also be used in a method of forming an ink-jet ink print, and vice versa.

With these definitions and the above discussion in mind, an ink-jet ink can comprise a liquid vehicle, a colorant dispersed or dissolved in the liquid vehicle, inter-crosslinkable latex particles dispersed in the liquid vehicle, and an inter-particle crosslinker. The inter-crosslinkable latex particles can comprise i) at least one hydrophobic monomer; ii) at least one acidic monomer; iii) at least one inter-crosslinkable monomer including at least one keto group; the intercrosslinkable monomer having the general formula

Formula 1 where R1 is H or $CH_3$; X is a divalent hetero atom linking group or a bond, Y is a divalent hetero atom linking group, R2 is a divalent linking group, R3 is a divalent linking group, and R4 is an alkyl, aryl, substituted alkyl, or substituted aryl group; and iv) an intra-particle crosslinker. Additionally, the inter-crosslinkable latex particles can be intra-crosslinked and can form an inter-particle crosslinked latex polymer film after printing the ink-jet ink on a substrate and upon at least partial depletion of the liquid vehicle or a liquid vehicle component.

A method of forming an ink-jet ink print can comprise printing any ink-jet ink composition described herein, and forming an inter- and intra-particle cross-linked latex polymer film upon at least partial depletion of the liquid vehicle or a liquid vehicle component.

An ink-jet printing system can comprise a substrate, any ink-jet ink composition described herein, and an ink-jet printer having a reservoir containing the ink-jet ink composition and having an ink-jet printhead configured to eject the ink-jet ink composition onto the substrate. Additionally, the ink-jet ink composition can be formulated to form an inter- and intra-particle cross-linked latex polymer film after printing the ink-jet ink composition on the substrate and upon at least partial depletion of the liquid vehicle or a liquid vehicle component.

As briefly mentioned, the inter-crosslinkable monomers can be monomers having moieties present in the latex particle that are configured to react with the inter-particle crosslinker(s) in the ink composition. In one embodiment, suitable inter-crosslinkable monomers include those with keto groups. As such, a general structure for the inter-crosslinkable monomers can be described as follows:

Formula 1 where:
R1=H or $CH_3$;
X=a divalent hetero atom linking group or a bond,
Y=a divalent hetero atom linking group,
R2=a divalent linking group
R3=a divalent linking group, and
R4=an alkyl, aryl, substituted alkyl or substituted aryl group.

In one embodiment, the divalent hetero atom linking group can be any divalent atom or a bond. For example, the divalent atom linking group can be O, NH, S, or a covalent bond. Additionally, the divalent hetero atom linking group can be any group of atoms containing a divalent hetero atom. The divalent linking group can be any organic group with divalent functionality. For example, the divalent linking group can be alkylene ($CH_2CH_2$) or arylene. While the X and Y identified above refer to a divalent hetero atom linking group, it is understood that X and Y need not refer to the same divalent hetero atom linking group, although such a structure is contemplated herein. Similarly, R2 and R3 need not refer to the same divalent linking group, although such a structure is contemplated herein. As such, in one embodiment, X can be the same as Y and/or R2 can be the same as R3. In another embodiment, X can be different than Y and/or R2 can be different than R3.

Non-limiting examples of such inter-crosslinkable monomers include 2-(methacryloyloxy)ethyl acetoacetate:

and diacetone acrylamide:

When crosslinker initiated (inter) cross-linking takes place as a result of the aqueous solvent vehicle being depleted and eliminated in the ink, the post inter-crosslinked ink-jet ink film print that forms is stronger.

Furthermore, at least 0.1% of total cross-linkable sites may be present exclusively on the surface of the latex polymer particles. The availability of the cross-linkable sites at the surface (and thus available for inter-crosslinking interaction) generally depends upon when in the process (vis-à-vis other monomer(s) addition) and how much of the inter-crosslinkable monomer (again, relative to other monomer(s) addition) is added. For example, the inter-crosslinkable monomer, if added along with other monomers, may be present almost uniformly throughout the latex polymer particles and on the surfaces thereof. In this case, the amount of these units available for inter-crosslinking will be less since they are present throughout the latex polymer particles. On the other hand, if the inter-crosslinkable monomer is added after addition of other monomers, then almost all of the inter-crosslinkable monomer (e.g., ~100%) will be on the latex polymer particles' surfaces. At the same time, if the same inter-crosslinkable monomer is added after addition of ~60% of other non-keto containing monomers, then the inter-crosslinkable monomer present on the polymer particles surfaces may be ~40%. In one embodiment, the inter-crosslinkable latex particles can have at least 10% of the inter-crosslinkable monomer on the surface of the inter-crosslinkable latex particles providing cross-linking sites on the surface of the inter-crosslinkable latex particles. In one embodiment, the inter-crosslinkable latex particles can have from about 3% to about 6% of the inter-crosslinkable monomer on the surface of the inter-crosslinkable latex particles providing cross-linking sites on the surface of the inter-crosslinkable latex particles.

As such, it is to be understood that up to about 100% of total inter-crosslinkable sites may be present on the surface of the latex polymer particles, throughout the bulk of the latex polymer particles, or on/throughout combinations thereof. As used herein, the "throughout the bulk of the latex polymer particles" is intended to mean that the keto group-containing monomer (i.e. the inter-crosslinkable monomer) presents itself throughout the latex polymer particle. As mentioned above, when the inter-crosslinkable monomer is within (as opposed to on the surface of) the latex polymer particles, the cross-linking sites on those monomer(s) are generally not available for cross-linking.

The hydrophobic monomer can be present in the latex particle from up to 98 wt %. Hydrophobic monomers that can be polymerized in the high $T_g$ polymer include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers can be present in the latex particle from about 0.1 wt % to about 30 wt %. Acidic monomers that can be used in the high $T_9$ polymer include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

When an intra-particle crosslinker is included in the ink-jet ink composition, these compounds can be configured to cross-link the monomers of the latex within the latex particle during manufacturing of the latex particle. As such, in one embodiment, the intra-particle crosslinker can be any difunctional free-radically polymerizable monomer. Generally, the intra-particle crosslinker can be present in the latex particle from about 0.1 wt % to about 25 wt %. In one embodiment, the intra-particle crosslinker can be present in the latex particle from about 0.2 wt % to about 1 wt %. In another embodiment, the intra-particle crosslinker can be selected from the group consisting of ethylene glycol dimethacrylate, diethylene glycol dimethacrylate, pentaerythritol triacrylate, pentaerythritol tetraacrylate, bis(acrylamido)ethylene, and mixtures thereof.

Generally, the inter-crosslinkable latex particles can be prepared by emulsion polymerization techniques such as batch, semi-batch or mini-emulsion processes. Such inter-crosslinkable latex particles may be produced using hydrophobic monomers, acidic monomers, along with at least one inter-crosslinkable monomer and at least one intra-particle crosslinker. In one embodiment, the inter-crosslinkable latex particles can be polymerized from at least one hydrophobic monomer, present in an amount up to 98 wt % of the total monomers, and selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and mixtures thereof; at least one acidic monomer, present in an amount from about 0.1 wt % to about 30 wt % of the total monomers, and selected from the group consisting of acrylic acid, methacrylic acid, itaconic acid, maleic acid, vinyl benzoic acid, derivatives thereof, and mixtures thereof; at least one inter-crosslinkable monomer, present in an amount from about 0.1 wt % to about 25 wt % of the total monomers, and selected from the group consisting of 2-(methacryloyloxy)ethyl acetoacetate, diacetone acrylamide, and mixtures thereof; and an intra-particle crosslinker, present in an amount from about 0.1 wt % to about 25 wt % of the total monomers, and selected from the group consisting of ethylene glycol dimethacrylate, diethylene glycol dimethacrylate, pentaerythritol triacrylate, pentaerythritol tetraacrylate, bis(acrylamido)ethylene, and mixtures thereof.

When an inter-particle crosslinker is included in the ink-jet ink composition, these compounds can be configured to react (during and/or after printing of the ink) with the crosslinking moieties of the inter-crosslinkable monomers. In one embodiment, the inter-particle crosslinker can be selected from the group consisting of diamino compounds, polyamino compounds, and mixtures thereof. Suitable examples of the inter-particle crosslinkers include, but are not limited to, compounds containing diamino groups such as adipic acid dihydrazide, ethylene diamine, propylene diamine, or combinations thereof. It is to be understood that further examples of the inter-particle crosslinkers include other compounds containing di- or poly-amino groups containing either primary or secondary amino groups. Some non-limiting examples of suitable polyamino compounds include ethylenediamine; diethylenetriamine; triethylenetetramine; propylenediamine; polyethyleneimine having a $M_w$ from about 400 to about 500,000; and combinations thereof.

It is to be understood that the inter-particle crosslinker may be present in the ink composition in an amount ranging from about 1 mole % to about 100 mole % with respect to the total inter-crosslinkable sites. In an alternate embodiment, the inter-particle crosslinker may be present in the ink composition in an amount ranging from about 20 mole % to about 50 mole % with respect to the total inter-crosslinkable sites.

Generally, the inter-crosslinkable latex particles can be present in the ink composition in an amount ranging from about 0.5 wt % to about 40 wt %. In one embodiment, the inter-crosslinkable latex particles can be present in the ink composition in an amount ranging from about 3 wt % to about 6 wt %. As discussed above, the present ranges include all sub-ranges. For example, the inter-crosslinkable latex particles can be present in the ink composition from about 1 wt % to about 15 wt %, about 1 wt % to about 5 wt %, about 3 wt % to about 40 wt %, about 3 wt % to about 15 wt %, etc.

Additionally, the inter-crosslinkable latex particles can have a $T_g$ ranging from about −40° C. to about 125° C. In one embodiment, the $T_g$ of the inter-crosslinkable latex particles can range from about 15° C. to about 45° C. As discussed above, the present ranges include all sub-ranges. For example, the inter-crosslinkable latex particles can have a $T_g$ from about 0° C. to about 75° C., about 0° C. to about 45° C., about 15° C. to about 75° C., about 20° C. to about 40° C., etc.

Generally, the inter-crosslinkable particles form an inter-particle cross-linked latex polymer film after printing upon depletion or partial depletion of the liquid vehicle or a liquid vehicle component. As discussed herein, the removal can be caused by various means including evaporation, heating, absorption, etc. In one embodiment, the depletion or partial depletion can be caused by evaporation of the liquid vehicle or a liquid vehicle component or can be caused by heating of the liquid vehicle or a liquid vehicle component. In one aspect, the printed ink can be heated. The heating can be to a temperature sufficient to cause at least partial depletion of the liquid vehicle or a liquid vehicle component. In one embodiment, the printed ink can be heated to a temperature of at least 70° C. In another embodiment, the printed ink can be heated to a temperature of at least 50° C. As discussed above, the present ranges include all sub-ranges. For example, the printed ink can be heated to a temperature of at least 30° C., at least 40° C., at least 60° C., etc.

As discussed above, the cross-linking may begin substantially immediately upon printing, e.g., a few seconds after printing as the liquid vehicle or a liquid vehicle component begins to deplete, e.g., evaporate. It is to be further understood that the cross-linking generally continues to occur, for a time period ranging from about 2 seconds to about 24 hours. In an embodiment, this time period ranges from about 2 seconds to about 2 hours.

Additionally, the liquid vehicle can include a co-solvent that enhances the depletion. In one embodiment, the ink can contain a volatile organic co-solvent having a boiling point of less than 100° C. In another embodiment, the volatile organic co-solvent can have a boiling point of less than 75° C. In yet another embodiment, the volatile organic co-solvent can have a boiling point of less than 50° C. Examples of volatile co-solvents include, without limitation, 2-pyrrolidone, N-methylpyrrolidone, 1,5-pentanediol, 1,6-hexanediol, 1,5-hexanediol and propylene glycol dimethyl ether, and mixtures thereof. Further, the liquid vehicle can include a mixture of co-solvents that enhance depletion. In one embodiment, the liquid vehicle can include at least two co-solvents that form a positive azeotrope; i.e., where the boiling point of the azeotrope is less than the boiling point of either of the individual co-solvents that form the azeotrope.

Without being bound to any theory, it is believed that the durability discussed herein is achieved by intra-particle cross-linking of the latex particles and then further inter-particle cross-linking of such latex particles that takes place after ink-jet printing while the liquid vehicle or liquid vehicle component in the ink is being depleted. In one embodiment, the ink-jet ink print can exhibit increased durability relative to an ink-jet ink print not including the intra-particle cross-linked latex polymer film. The increased durability can include an improvement in highlighter smearfastness, rub resistance, wet smudgefastness, solvent resistance, or combinations thereof. The relative comparison can generally involve comparing the present inks having the inter-crosslinkable latex particles to a comparison ink that does not have inter-crosslinkable particles and therefore does not form the inter-particle cross-linked latex polymer film. Additionally, in another embodiment, the present inter-crosslinkable particles that have been intra-crosslinked can exhibit improvement over inter-crosslinkable particles that have not been intra-crosslinked. In one embodiment, the comparative ink can have the same components as the present inks except for the inter-crosslinkable particles described herein. In another embodiment, the difference between the present inks and the comparative inks can solely be due to the presence of the inter-crosslinkable monomer in the present latex particles and the absence of the inter-crosslinkable monomers in the latex particles of the comparative ink, allowing for a completely objective comparison as to the increased durability of the present inks over the comparative ink. Additionally, in still another embodiment, the difference between the present inks and the comparative inks can solely be due to the presence of the intra-crosslinker in the present latex particles and the absence of the intra-crosslinker in the latex particles of the comparative ink, allowing for a completely objective comparison as to the increased durability of the present inks over the comparative ink. Further, the difference between the present inks and the comparative inks can be due to the presence or absence of the inter-crosslinkable monomer and the intra-crosslinker.

The instant application relates to the improvement in durability of ink-jet inks. These durability improvements encompass: excellent highlighter smearfastness, rub resistance, wet smudgefastness, and solvent resistance (e.g., as represented by the window cleaner test described below). Generally, rub resistance and window cleaner tests are more aggressive tests, as compared to, e.g., the highlighter smearfastness and wet smudgefastness tests. The solvent used in the window cleaner test is more aggressive than highlighter fluid, and the rub resistance test uses a more abrasive material than a highlighter tip. As such, ink-jet inks exhibiting better performance in the window cleaner and rub resistance tests should exhibit better performance in the highlighter smearfastness and wet smudgefastness tests.

Additionally, inter-crosslinkable latex particles described herein can be further stabilized by addition of surfactants. As such, in one embodiment, the latex particles can further comprise a reactive surfactant during the polymerization process. Generally, the reactive surfactant contains hydrophobic moieties that can be covalently bound to the surface of the polymeric particles. Additionally, such a reactive surfactant can be incorporated during the polymerization via appropriate organic groups, e.g., a vinyl group, such that the surface of the latex particles contains the reactive surfactant. Generally, the reactive surfactant can contain hydrophilic groups that allow the polymeric particles to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in one embodiment, the reactive surfactants can be functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAXEMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

The ink-jet ink compositions of the present disclosure may be suitable for use on many types of substrates of recording media, including but not limited to vinyl media, cellulose-based paper media, various cloth materials, polymeric materials (non-limitative examples of which include polyester white film or polyester transparent film), photopaper (non-limitative examples of which include polyethylene or polypropylene extruded on one or both sides of paper), metals, and/or mixtures thereof. A non-limitative example of a suitable metal material is a metal in foil form made from, for example, at least one of aluminum, silver, tin, copper, alloys thereof, and/or mixtures thereof. The inks described herein are particularly useful in printing on non-porous substrates, such as vinyl and plastics, films, metals, and the like.

With these parameters in place regarding some of the possible inter-crosslinkable latex particles that can be formed, a discussion of dispersion fluids, e.g., inks, etc., is useful to exemplify how these polymers can be implemented for use in accordance with an embodiment of the present disclosure. Typically, inks can include a colorant dispersed in a liquid vehicle. Typical liquid vehicle formulation that can be used with the inter-crosslinkable latex particles described herein can include water, and optionally, one or more co-solvents present in total at from 0.1 wt % to 30 wt %, depending on the jetting architecture. Further, one or more non-ionic, cationic, and/or anionic surfactant can optionally be present, ranging from 0.01 wt % to 10 wt %. The balance of the formulation can be purified water, or other vehicle components known in the art, such as biocides, viscosity modifiers, materials for pH adjustment, sequestering agents, preservatives, and the like. In one embodiment, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0 wt % to 10 wt %. It is to be noted that the surfactant that is described as being usable in the liquid vehicle is not the same as the surfactant that is described as being adhered to the surface of the latex particles, though many of the same surfactants can be used for either purpose.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

EXAMPLES

The following examples illustrate embodiments of the disclosure that are presently known. Thus, these examples should not be considered as limitations of the disclosure, but are merely in place to teach how to make compositions of the present disclosure. As such, a representative number of compositions and their method of manufacture are disclosed herein.

Example 1

Synthesis of Inter-Crosslinkable Latex Particles Having Intra-Crosslinking

Monomers of styrene (212 g), butyl acrylate (80 g), methacrylonitrile (80 g), methacryloyloxyethylacetoacetate (20 g), methacrylic acid (8 g) and ethylene glycol dimethacrylate (2.4 g) were emulsified in water (160 ml) containing reactive surfactant MAXEMUL 6106 (4 g) from Uniqema. An Initiator solution was prepared by dissolving potassium persulfate (2 g) in water (160 ml). Water (1160 ml) was heated to 89° C., at which time 32 ml of the initiator solution was added. This was followed by the simultaneous addition of the emulsified monomer solution and the remaining initiator solution added over a period of 55 minutes and 61 minutes, respectively. This reaction mixture was maintained at a temperature of about 89° C. for a period of about 8 hours and then cooled to ambient temperature. The pH was then adjusted to 8.5 with 50% potassium hydroxide solution. The reaction mixture was filtered with 200 mesh filter to obtain inter-crosslinkable latex particles in about 21% solid.

Example 2

Preparation of Ink with the Inter-Crosslinkable Latex Particles of Example 1

An ink-jettable coating composition was prepared by dispersing 6 wt % solid of the inter-crosslinkable latex particles of Example 1 in a liquid vehicle having adipic acid dihydrazide with half of the molar equivalent of methacryloyloxyethylacetoacetate. The liquid vehicle included 20 wt % organic co-solvent, 0.5 wt % surfactant, 0.5 wt % biocide with the balance being water. The ink also contained about 3% of pigments to impart color.

Example 3

Preparation of Control Ink

A control latex not capable of inter- and intra-crosslinking was prepared similar to Example 1 by removing the methacryloyloxyethylacetoacetate monomer and the ethylene glycol dimethacrylate monomer.

Once isolated, the control latex was added to the liquid vehicle of Example 2, providing a control ink having a similar makeup of the inter-crosslinkable latex particle ink of Example 1, except for the ability to inter- and intra-crosslink due to the absence of the methacryloyloxyethylacetoacetate monomer and the ethylene glycol dimethacrylate monomer. Such a control allows for an objective comparison.

Example 4

Preparation of Control Ink

A control latex not capable of intra-crosslinking but capable of inter-crosslinking was prepared similar to Example 1 by removing the ethylene glycol dimethacrylate monomer. Once isolated, the control latex was added to the liquid vehicle of Example 2, providing a control ink that has a similar makeup of the intra- and inter-crosslinkable latex particle ink of Example 2, except for the ability to intra-crosslink due to the absence of the ethylene glycol dimethacrylate monomer. Such a control allows for an objective comparison.

Example 5

Durability Tests

The control inks (Examples 3 and 4) and the ink from Example 2 were filled into ink-jet pens and printed with a Hewlett-Packard printer. They were printed on a vinyl media. After printing, the inks were subjected to a dry rub test and a window cleaner test.

The dry rub test was performed with a linear abraser (specifically a TABER® Linear Abraser-Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the rub test, a stroking head or "weaeraser" was attached to the end of the arm of the linear abraser. The stroking head was the size and shape of a pencil eraser and had a contact patch with a diameter of approximately ¼ inch diameter. The stroking head was abrasive (specifically CALIBRASE® CS-10) with a mild to medium abrasive effect. The stroking head was stroked back and forth 10 times on each media sample. The rubbed media samples were judged for color fastness The window cleaner test was performed with a linear abraser (specifically a Taber® Linear Abraser-Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the window cleaner test, an acrylic finger (specifically from a Taber® Crock Meter Kit) covered by a cloth (specifically a TABER® Crocking Cloth) was attached to the end of the arm of the linear abraser. WINDEX® window cleaner was applied to the cloth, and the cloth-covered end of the acrylic finger was stroked back and forth 5 times on each media sample. The rubbed media samples were judged for color fastness.

After testing, the inks were visually graded as either pass or fail. A passing grade was given if the ink maintained enough adhesion to obscure the substrate while a failing grade was given if portions of the ink were completely removed from the substrate.

Figure 1:
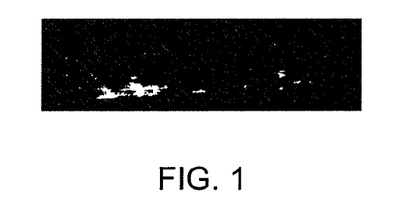
FIG. 1 is a photograph of the result of a window cleaner test of the control ink sample described in Example 4.
Figure 2:
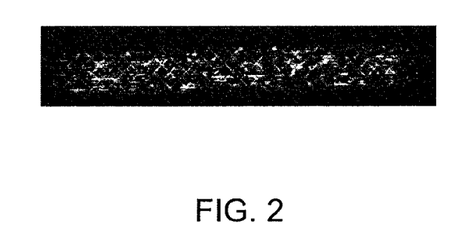
FIG. 2 is a photograph of the result of a dry rub test of the control ink sample described in Example 4.
Figure 3:
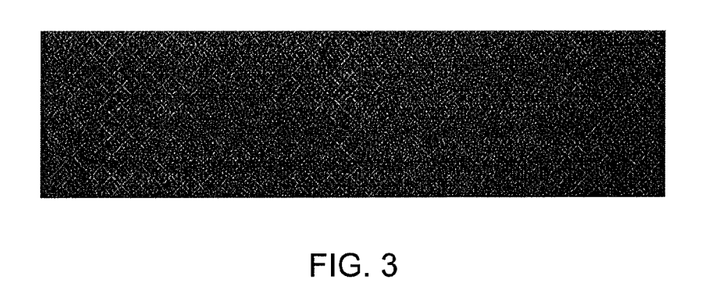
FIG. 3 is a photograph of the result of a window cleaner test of the ink sample having inter-crosslinkable latex particles described in Example 2, in accordance with an embodiment.
Figure 4:
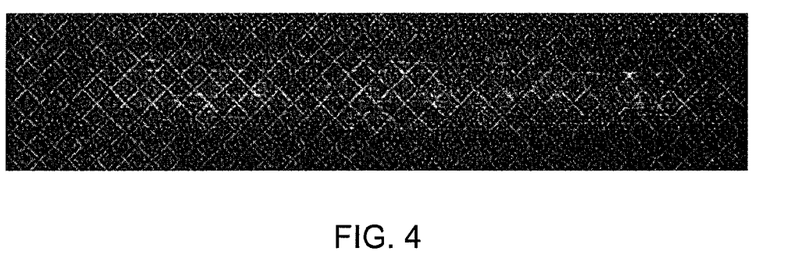
FIG. 4 is a photograph of the result of a dry rub test of the ink sample having inter-crosslinkable latex particles described in Example 2, in accordance with an embodiment.

The control ink from Example 3 failed both tests as portions of the ink completely lifted from the substrate. Additionally, the control ink from Example 4 failed both tests as well. While the control ink from Example 4 performed better than the control ink from Example 3, as can be seen in FIGS. 1 and 2, portions of the control ink from Example 4 were also completely removed from the substrate. However, the ink containing inter-crosslinkable latex particles having intra-crosslinking passed both tests (FIGS. 3 and 4) after printing and forming an inter-particle crosslinked latex polymer film.

Additionally, a printability study was performed for the control ink of Example 4 and the ink from Example 2 containing the inter-crosslinkable latex particles. The following Table I shows the resultant data from printing both inks.

TABLE I

| | Printability Test data for Examples 2 and 4 | | |
|---|---|---|---|
| Inks | Printing Frequency | Acceptable Printing | Decap (drops to recover) |
| Example 2 | Prints up to 36 kHz | Up to 4 pages | 2 |
| Example 4 | Prints up to 24 kHz | One page | 3 |

The control ink only printed up to 24 kHz while the ink prepared in accordance with the present disclosure (Example 2) printed up to 36 kHz. Additionally, the quality of printing for the Example 2 ink was much higher as this particular ink printed up to 4 pages with no errors. However, the control ink printed only one page before printing errors began to occur. This indicates that latex particles with intra- and inter-crosslinkable units exhibit better durability and printability. Further, the Example 2 ink provided improved decap compared to the control ink, requiring only 2 drops to recover instead of 3.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. An ink jet ink composition, comprising:
   a) a liquid vehicle;
   b) a colorant dispersed or dissolved in the liquid vehicle;
   c) inter-crosslinkable latex particles dispersed in the liquid vehicle, the inter-crosslinkable latex particles comprising:
      i) at least one hydrophobic monomer,
      ii) at least one acidic monomer,
      iii) at least one inter-crosslinkable monomer including at least one keto group, and having the general formula where R1=H or CH3; X = a divalent hetero atom linking group or a bond, Y = a divalent hetero atom linking group, R2=a divalent linking group, R3=a divalent linking group, and R4=an alkyl, aryl, substituted alkyl, or substituted aryl group, and
      iv) an intra-particle crosslinker; and
   d) an inter-particle crosslinker;
   wherein the inter-crosslinkable latex particles are intra-crosslinked and form an inter-particle crosslinked latex polymer film after printing the ink jet ink on a substrate and upon at least partial depletion of the liquid vehicle or a liquid vehicle component.

2. The ink jet ink composition of claim 1, wherein the inter-crosslinkable latex particles are present in the ink composition in an amount ranging from about 0.5 wt% to about 40 wt% and have a $T_g$ ranging from about −40° C. to about 125° C.

3. The ink jet ink composition of claim 1, wherein the at least one hydrophobic monomer is up to 98 wt% of the monomers and is selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and mixtures thereof;
   wherein the at least one acidic monomer is from about 0.1 wt% to about 30 wt% of the monomers and is selected from the group consisting of acrylic acid, methacrylic acid, itaconic acid, maleic acid, vinyl benzoic acid, and mixtures thereof;
   wherein the at least one inter-crosslinkable monomer is from about 0.1 wt% to about 25 wt% of the monomers and is 2-(methacryloyloxy)ethyl acetoacetate; and
   wherein the intra-particle crosslinker is from about 0.1 wt% to about 25 wt% of the monomers and is selected from the group consisting of ethylene glycol dimethacrylate, diethyl glycol dimethacrylate, pentaerythritol triacrylate, pentaerythritol tetra acrylate, bis(acrylamido)ethylene, and mixtures thereof.

4. The ink jet ink composition of claim 3 wherein the inter-particle crosslinker is selected from adipic acid dihydrazide, ethylene diamine, propylene diamine, ethylenediamine, diethylenetriamine, triethylenetetramine, propylenediamine, polyethyleneimine having a Mw from about 400 to about 500,000, or mixtures thereof.

5. The ink jet ink composition of claim 1, wherein the at least partial depletion is caused by evaporation of the liquid vehicle or a liquid vehicle component at ambient conditions or by heating of the liquid vehicle or a liquid vehicle component.

6. The ink jet ink composition of claim 1, wherein the inter-crosslinkable latex particles are present in the ink composition from about 3 wt% to about 6 wt% and the $T_g$ of the inter-crosslinkable latex particles ranges from about 15° C. to about 45° C.

7. The ink jet ink composition of claim 1, wherein the inter-crosslinkable latex particles have at least 10% of the inter-crosslinkable monomer on the surface of the inter-crosslinkable latex particles providing cross-linking sites on the surface of the inter-crosslinkable latex particles.

8. A method of forming an ink jet ink print, comprising:
   printing the ink-jet ink composition of claim 1; and
   forming an inter- and intra-particle cross-linked latex polymer film upon at least partial depletion of the liquid vehicle or a liquid vehicle component.

9. The method of claim 8, wherein the ink jet ink print exhibits increased durability relative to an ink jet ink print that includes a latex polymer film that is not both inter- and intra-particle cross-linked, but which is otherwise identical, said increased durability including improvement in highlighter smearfastness, rub resistance, wet smudgefastness, solvent resistance, or combinations thereof.

10. The method of claim 8, wherein the inter-crosslinkable latex particles are present in the ink composition from about 3 wt% to about 6 wt% and the $T_g$ of the inter-crosslinkable latex particles ranges from about 15° C. to about 45° C.

11. The method of claim 8, wherein the partial depletion is caused by evaporation or by heating.

12. An ink jet printing system, comprising:
   a) a substrate;
   b) the ink jet ink composition of claim 1; and c) an ink jet printer having a reservoir containing the ink jet ink composition and having an ink jet printhead configured to eject the ink-jet ink composition onto the substrate;

wherein the ink-jet ink composition is formulated to form an inter- and intra-particle cross-linked latex polymer film after printing the ink jet ink composition on the substrate and upon at least partial depletion of the liquid vehicle or a liquid vehicle component.

13. The ink-jet printing system of claim 12, wherein the substrate is non-porous.

14. The ink jet printing system of claim 12, wherein the inter-crosslinkable latex particles are present in the ink composition from about 3 wt% to about 6 wt% and the $T_g$ of the inter-crosslinkable latex particles ranges from about 15° C. to about 45° C.

15. The ink jet printing system of claim 12, wherein the at least one hydrophobic monomer is up to 98wt% of the monomers and is selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and mixtures thereof;

wherein the at least one acidic monomer is from about 0.1 wt% to about 30 wt% of the monomers and is selected from the group consisting of acrylic acid, methacrylic acid, itaconic acid, maleic acid, vinyl benzoic acid, and mixtures thereof;

wherein the at least one inter-crosslinkable monomer is from about 0.1 wt% to about 25 wt% of the monomers and is 2-(methacryloyloxy)ethyl acetoacetate; and wherein the intra-particle crosslinker is from about 0.1 wt% to about 25 wt% of the monomers and is selected from the group consisting of ethylene glycol dimethacrylate, diethyl glycol dimethacrylate, pentaerythritol triacrylate, pentaerythritol tetraacrylate, bis(acrylamido)ethylene, and mixtures thereof.

16. An ink jet ink composition, comprising:
a) a liquid vehicle;
b) a colorant dispersed or dissolved in the liquid vehicle;
c) inter-crosslinkable latex particles dispersed in the liquid vehicle, the inter-crosslinkable latex particles comprising:
 i) at least one hydrophobic monomer,
 ii) at least one acidic monomer,
 iii) diacetone acrylamide, and
 iv) an intra-particle crosslinker; and
d) an inter-particle crosslinker selected from the group consisting of adipic acid dihydrazide, ethylene diamine, propylene diamine, diethylenetriamine, triethylenetetramine, propylenediamine, polyethyleneimine having a Mw from about 400 to about 500,000, or mixtures thereof;

wherein the inter-crosslinkable latex particles are intra-crosslinked and form an inter-particle crosslinked latex polymer film by reaction with the inter-particle crosslinker after printing the ink jet ink on a substrate and upon at least partial depletion of the liquid vehicle or a liquid vehicle component.

17. The ink jet ink composition of claim 16, wherein the inter-crosslinkable latex particles are present in the ink composition in an amount ranging from about 0.5 wt% to about 40 wt% and have a $T_g$ ranging from about -40° C. to about 125° C.

18. The ink jet ink composition of claim 16, wherein the at least one hydrophobic monomer is up to 98 wt% of the monomers and is selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and mixtures thereof;

wherein the at least one acidic monomer is from about 0.1 wt% to about 30 wt% of the monomers and is selected from the group consisting of acrylic acid, methacrylic acid, itaconic acid, maleic acid, vinyl benzoic acid, and mixtures thereof; and wherein the intra-particle crosslinker is from about 0.1 wt% to about 25 wt% of the monomers and is selected from the group consisting of ethylene glycol dimethacrylate, diethyl glycol dimethacrylate, pentaerythritol triacrylate, pentaerythritol tetra acrylate, bis(acrylamido)ethylene, and mixtures thereof.

19. The ink jet ink composition of claim 16, wherein the at least partial depletion is caused by evaporation of the liquid vehicle or a liquid vehicle component at ambient conditions or by heating of the liquid vehicle or a liquid vehicle component.

20. The ink jet ink composition of claim 16, wherein the inter-crosslinkable latex particles have at least 10% of the diacetone acrylamide on the surface of the inter-crosslinkable latex particles providing cross-linking sites on the surface of the inter-crosslinkable latex particles.

* * * * *